(12) United States Patent
Bankhead et al.

(10) Patent No.: US 8,605,119 B1
(45) Date of Patent: Dec. 10, 2013

(54) SCALING IMAGE MODULES

(75) Inventors: Paul Bankhead, Sunnyvale, CA (US); Huacheng Ke, Mountain View, CA (US)

(73) Assignee: Google Inc., Mountain View, CA (US)

( * ) Notice: Subject to any disclaimer, the term of this patent is extended or adjusted under 35 U.S.C. 154(b) by 187 days.

(21) Appl. No.: 13/250,244

(22) Filed: Sep. 30, 2011

(51) Int. Cl.
*G06G 5/00* (2006.01)
*G06F 3/048* (2013.01)

(52) U.S. Cl.
USPC .......................................... 345/660; 715/788

(58) Field of Classification Search
None
See application file for complete search history.

(56) References Cited

U.S. PATENT DOCUMENTS

| | | | | |
|---|---|---|---|---|
| 5,911,146 A * | 6/1999 | Johari et al. | ................... | 715/234 |
| 6,667,750 B1 * | 12/2003 | Halstead et al. | .............. | 715/788 |
| 7,337,393 B2 * | 2/2008 | Chartier et al. | ................ | 715/235 |
| 7,523,415 B1 * | 4/2009 | Porter | ........................... | 715/806 |
| 7,675,529 B1 * | 3/2010 | Brunner et al. | ............... | 345/661 |
| 7,770,109 B2 * | 8/2010 | Fortes | ........................... | 715/246 |
| 7,932,906 B2 * | 4/2011 | Hao et al. | ....................... | 345/440 |
| 8,230,324 B1 * | 7/2012 | Power et al. | ................... | 715/227 |
| 8,406,507 B2 * | 3/2013 | Ruzon et al. | ................... | 382/154 |
| 8,423,903 B2 * | 4/2013 | Pearce | ........................... | 715/799 |
| 2002/0085119 A1 * | 7/2002 | Van Overveld et al. | ...... | 348/553 |
| 2004/0189709 A1 * | 9/2004 | Halstead, Jr. | ................... | 345/788 |
| 2006/0161836 A1 * | 7/2006 | Thomson et al. | ............. | 715/505 |
| 2006/0168506 A1 * | 7/2006 | Endo et al. | ................. | 715/500.1 |
| 2008/0218532 A1 * | 9/2008 | Young | ........................... | 345/660 |
| 2008/0256439 A1 * | 10/2008 | Boreham et al. | ............... | 715/246 |
| 2009/0183065 A1 * | 7/2009 | Endo et al. | ...................... | 715/227 |
| 2010/0169765 A1 * | 7/2010 | Cui et al. | ....................... | 715/244 |
| 2010/0269037 A1 * | 10/2010 | Atkins | ........................... | 715/244 |
| 2010/0275152 A1 * | 10/2010 | Atkins et al. | ................... | 715/788 |
| 2012/0159299 A1 * | 6/2012 | Thomson et al. | ............. | 715/221 |
| 2012/0159314 A1 * | 6/2012 | Schrier et al. | .................. | 715/252 |
| 2012/0236008 A1 * | 9/2012 | Yamada et al. | ................ | 345/473 |
| 2013/0016127 A1 * | 1/2013 | Takashima | ..................... | 345/660 |
| 2013/0111333 A1 * | 5/2013 | Taleghani et al. | ............. | 715/252 |

OTHER PUBLICATIONS

Example pages from website Shoplocal.com, including "Circular Central", [online] Retrieved from the Internet [retrieved on Feb. 5, 2013] at URL:< http://www.shoplocal.com/?citystatezip=02108& newzone=y>, (2013).
DeSandro, David, "A dynamic layout plugin for jQuery—The flip side of CSS floats", pages from website "jQuery Masonry", [online] Retrieved from the Internet [retrieved on Feb. 5, 2013] at URL:<http://masonry.desandro.com>.

\* cited by examiner

*Primary Examiner* — Kee M Tung
*Assistant Examiner* — Haixia Du
(74) *Attorney, Agent, or Firm* — Fish & Richardson P.C.

(57) ABSTRACT

Techniques include: identifying scalable parts and unscalable parts of image modules that are to be scaled to fit within a fixed dimension; determining scaling factors that are to be applied to the scalable parts of the image modules to scale the image modules; applying the scaling factors to the scalable parts of the images modules to produce scaled image modules that fit within the fixed dimension, where the unscalable parts are unaffected by the scaling factors; and generating data for displaying the scaled image modules on a computing device display screen.

30 Claims, 12 Drawing Sheets

SCALING IMAGE MODULES

BACKGROUND

This disclosure relates to scaling image modules.

The Internet provides access to a wide variety of resources. For example, the Internet provides access to video files, audio files, and Web pages. Access to these resources presents opportunities for other content (e.g., advertisements) to be provided with the resources. For example, a Web page can include slots in which advertisements can be presented. A Web page can also include an electronic advertising circular. In an example electronic advertising circular, advertisements may be arranged in row format, in which rows of advertisements are presented, or column format, in which columns of advertisements are presented.

SUMMARY

Techniques for scaling image modules may include identifying scalable parts and unscalable parts of image modules that are to be scaled to fit within a fixed dimension; determining scaling factors that are to be applied to the scalable parts of the image modules to scale the image modules; applying the scaling factors to the scalable parts of the images modules to produce scaled image modules that fit within the fixed dimension, where the unscalable parts are unaffected by the scaling factors; and generating data for displaying the scaled image modules on a computing device display screen.

Each of the image modules may include an image, which may be a scalable part. At least some of the image modules may include an information bar for displaying information relating a corresponding image. For each image module, the information bar may be an unscalable part. At least some of the image modules may include padding. The padding may include pixels adjacent to a corresponding image and apart from the corresponding image. For each image module, the padding may be either a scalable part or an unscalable part.

Each image module has one or more of: an absolute height component that includes sums of heights of unscalable parts of the corresponding image module; an absolute width component that includes sums of widths of unscalable parts of the corresponding image module; a scalable height component that includes sums of heights of scalable parts of the corresponding image module; and a scalable width component that includes sums of widths of scalable parts of the corresponding image module. One or more of the absolute height component, the absolute width component, the scalable height component, and the scalable width component may be used in a process for determining the scaling factors.

The process for determining the scaling factors may include: generating a first equation by equating a sum of the absolute width components and the scalable width components with corresponding scaling factors applied thereto to a fixed width, where the fixed width is the fixed dimension, and where the scaling factors are unknown; generating second equations by equating a height of each image module to a height of another image module, where image module height for each image module includes a sum of a corresponding absolute height component and a corresponding scalable height component with a corresponding scaling factor applied thereto; and solving a linear system that includes the first equation and the second equation in order to determine the scaling factors.

The process for determining the scaling factors may include: generating a first equation by equating a sum of the absolute height components and the scalable height components with corresponding scaling factors applied thereto to a fixed height, where the fixed height is the fixed dimension, and where the scaling factors are unknown; generating second equations by equating a width of each image module to a width of another image module, where image module width for each image module includes a sum of a corresponding absolute width component and a corresponding scalable width component with a corresponding scaling factor applied thereto; and solving a linear system that includes the first equation and the second equation in order to determine the scaling factors.

The image modules may be arranged in a matrix that includes multiple rows and having a fixed height, where the fixed height is the fixed dimension. The process for determining the scaling factors may include: generating first equations by equating a width of each row to a width of another row, where row width for each row includes sums of image module widths in the corresponding row, and where each image module width includes a sum of a corresponding absolute width component and corresponding scalable width component with a corresponding scaling factor applied thereto; generating second equations by equating, for each row, a height of each image module in the corresponding row to a height of another image module in the corresponding row, where image module height for each image module in a row includes a sum of a corresponding absolute height component and a corresponding scalable height component with a corresponding scaling factor applied thereto; generating a third equation by selecting one image module from each row, summing heights of the selected image modules, and equating the summed height to the fixed height, where a height of a corresponding selected image module includes a sum of a corresponding absolute height component and a corresponding scalable height component with a corresponding scaling factor applied thereto; and solving a linear system that includes the first equations, the second equations, and the third equation in order to determine the scaling factors.

Image modules may be arranged in a matrix that includes multiple columns and having a fixed width, where the fixed width is the fixed dimension. The process for determining the scaling factors may include: generating first equations by equating a height of each column to a height of another column, where column height for each column includes sums of image module height in the corresponding column, and where each image module height includes a sum of a corresponding absolute height component and corresponding scalable height component with a corresponding scaling factor applied thereto; generating second equations by equating, for each column, a width of each image module in the corresponding column to a width of another image module in the corresponding column, where image module width for each image module in a column includes a sum of a corresponding absolute width component and a corresponding scalable width component with a corresponding scaling factor applied thereto; generating a third equation by selecting one image module from each column, summing widths of the selected image modules, and equating the summed width to the fixed width, where a width of a corresponding selected image module includes a sum of a corresponding absolute width component and a corresponding scalable width component with a corresponding scaling factor applied thereto; and solving a linear system that includes the first equations, the second equations, and the third equation in order to determine the scaling factors.

The image module may include an image that is an advertisement. The scaled image modules may be arranged as part of a matrix that constitutes an electronic circular.

Two or more of the features described in this disclosure, or portions thereof, including this summary section, may be combined to form embodiments not specifically described herein.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Described herein is a system for scaling image modules including, e.g., image modules that may be incorporated into an electronic advertising circular (or simply, "electronic circular"). In an example, the system includes identifying scalable parts and unscalable parts of image modules that are to be scaled to fit within, e.g., a width or a height of an electronic circular; determining scaling factors that are to be applied to the scalable parts of the image modules; and applying the scaling factors to the scalable parts of the image modules to scale the image modules to fit within the electronic circular. The unscalable parts of the image modules are typically unaffected by the scaling factors, e.g., the unscalable parts are not scaled.

The processes described herein for scaling image modules are described in the context of advertising and electronic circulars. However, the processes may be used in other contexts to scale other types of images.

Figure 1:
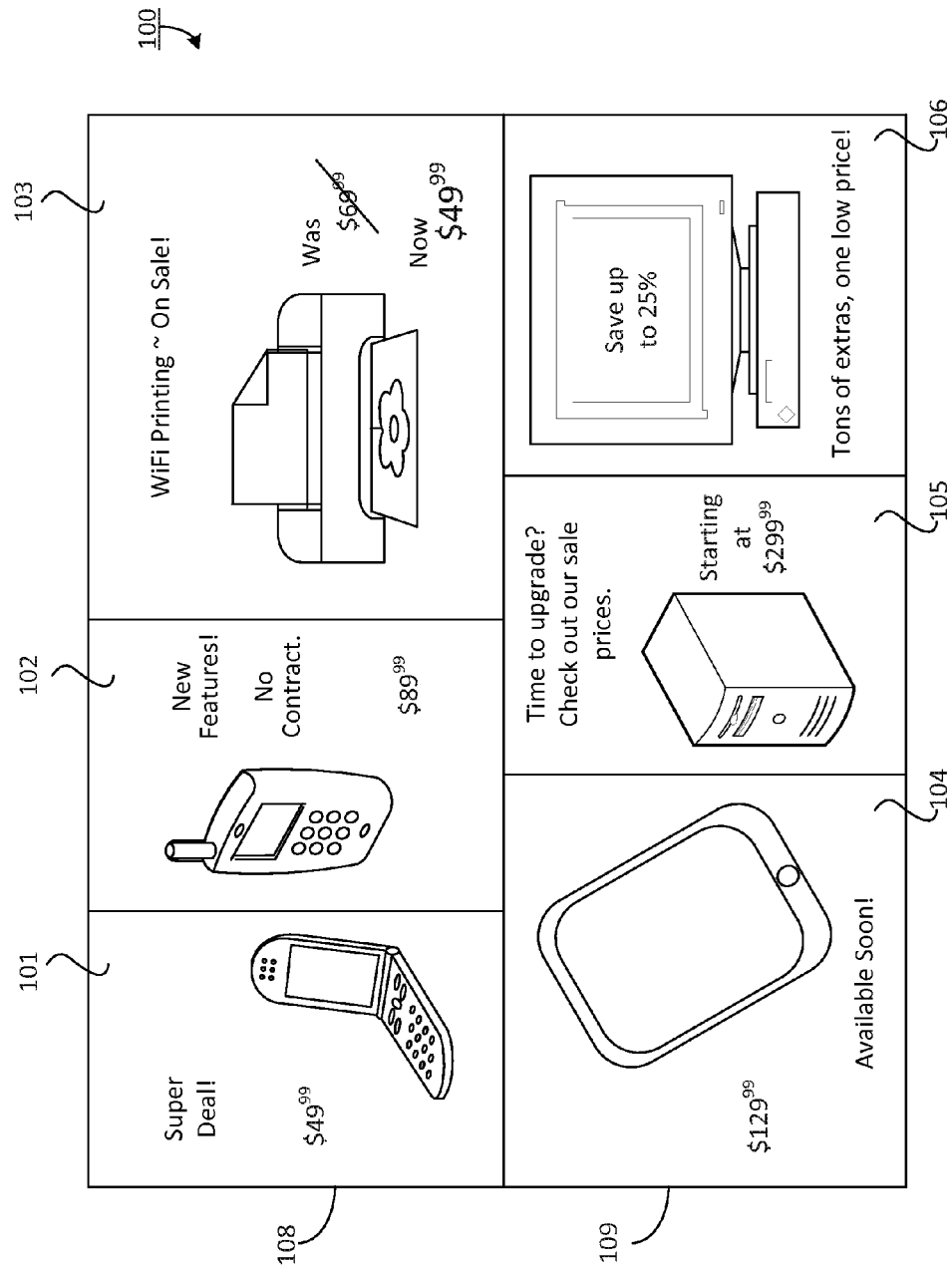
FIG. 1 is a block diagram showing an example electronic advertising circular having a row-based format.
Figure 2:
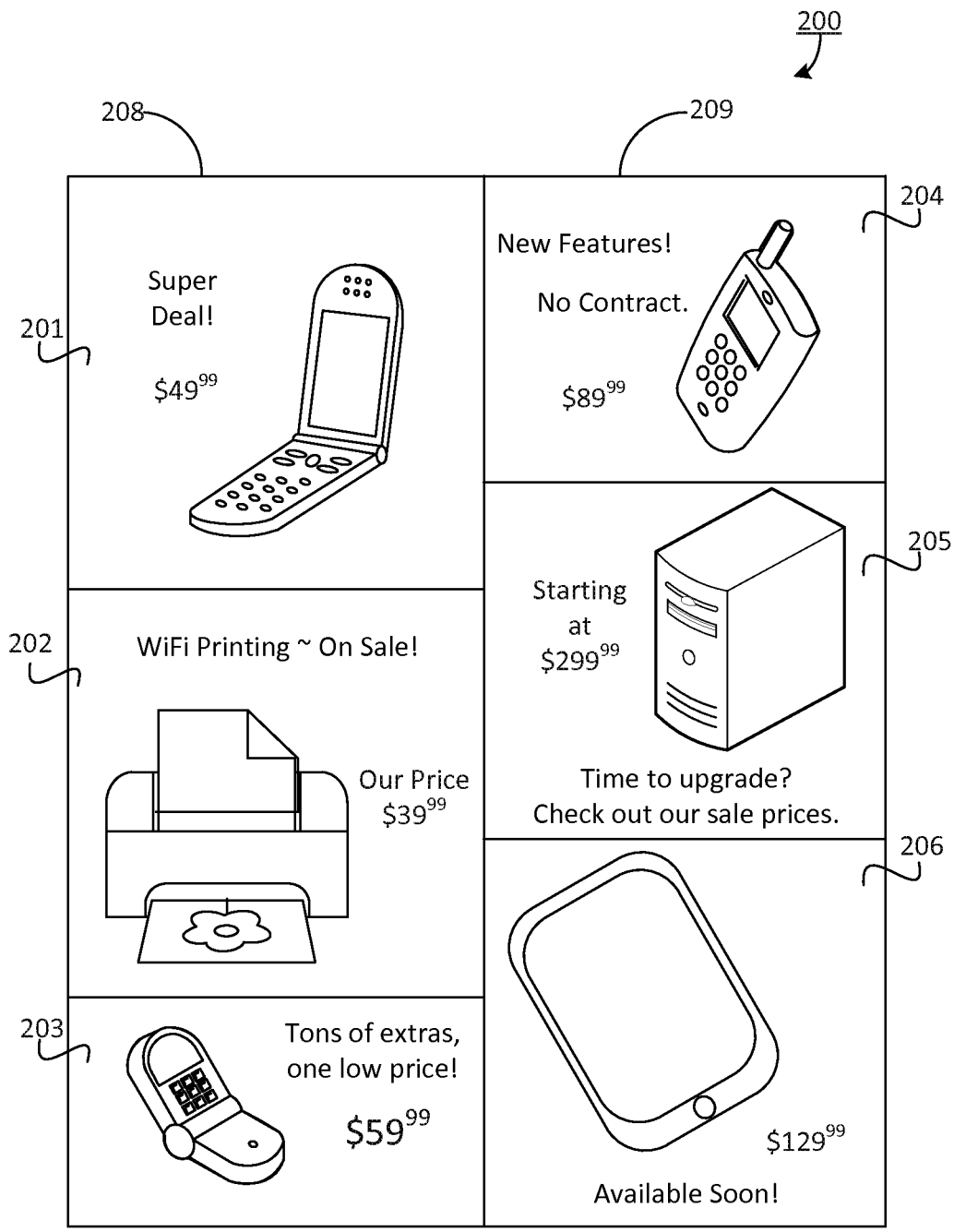
FIG. 2 is a block diagram showing an example electronic advertising circular having a column-based format.

FIG. 1 shows an example of an electronic circular 100. Electronic circular 100 includes image modules 101 to 106. In the example of FIG. 1, image modules 101 to 106 are arranged in rows, e.g., the image modules in each row 108 and 109 each have about the same height and are arranged horizontally. In another example, shown in FIG. 2, images modules 201 to 206 are arranged in columns, e.g., image modules in each column 208 and 209 each have about the same width, and are arranged vertically.

Figure 3:
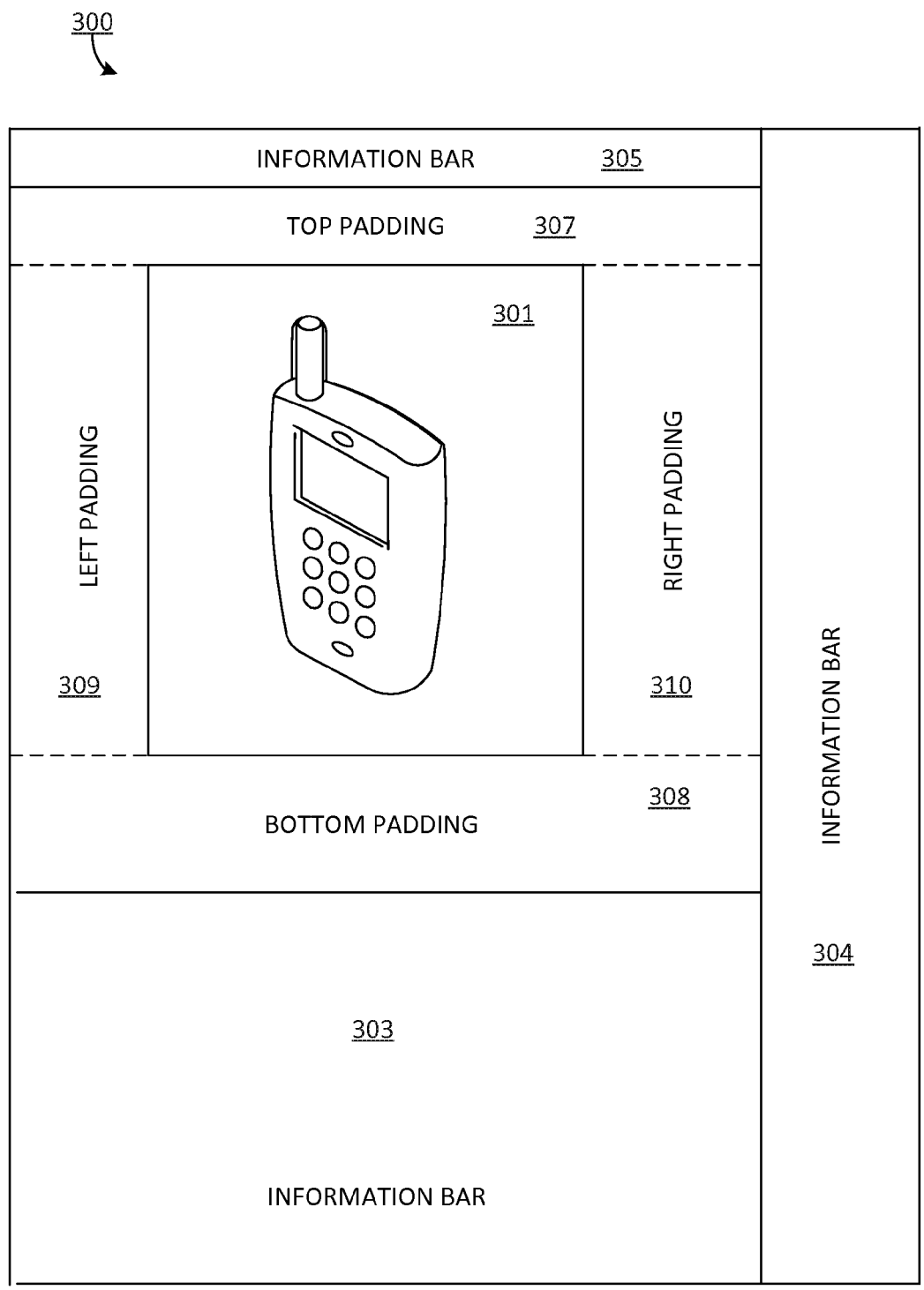
FIGS. 3 and 5 to 7 are block diagrams showing example image modules.

Referring to FIG. 3, an image module 300 typically includes an image, e.g., image 301, which depicts a product being advertised in the circular. In some examples, the image is a scalable part of the image module. For example, through scaling, the image may be increased or decreased in size. Increases or decreases in size may include changes to image height and/or width. In some examples, the aspect ratio of the image is preserved when the image is scaled, although this need not be the case.

An image module may also include other components. For example an image module 300 may include one or more information ("info") bars, e.g., 303, 304 and 305, which contain text relating to a corresponding image. For example, an information bar may specify the current sale price of the product, the duration of the sale, locations at which the product may be purchased, and so forth. One or more Information bars may be included, e.g., at the top, bottom, left and/or right of a corresponding image. Some image modules do not include information bars. In some examples, the information bar is an unscalable part of the image, e.g., it is not increased or decreased in size through scaling. In other examples, the information bar may be a scalable part of the image module. For example, by scaling, the information bar may be increased or decreased in size.

An image module may also include padding. In this example, padding includes pixels adjacent to the image, but that are not part of the image. For example, FIG. 3 shows top padding 307, bottom padding 308, left padding 309, and right padding 310. In some examples, the padding is monochromatic and is pre-selected to make the corresponding images stand-out. In other examples, the padding includes multiple colors, which may be pre-selected based, e.g., on the colors in the advertisement, colors in the circular, colors of adjacent padding or advertisements, or the like. The padding may be scalable or unscalable. For example, the padding may be defined in absolute terms, e.g., in terms a specific number of pixels (which, in this example, may not be scaled), or the padding may be defined in relative terms, e.g., as a percentage of the image size (which, in this example, may be scaled). By way of example, in image module 300, bottom padding 308 may be defined as having a height of 10 pixels, whereas top padding 307 may be defined as being 10% of the height of image 301.

Figure 4:
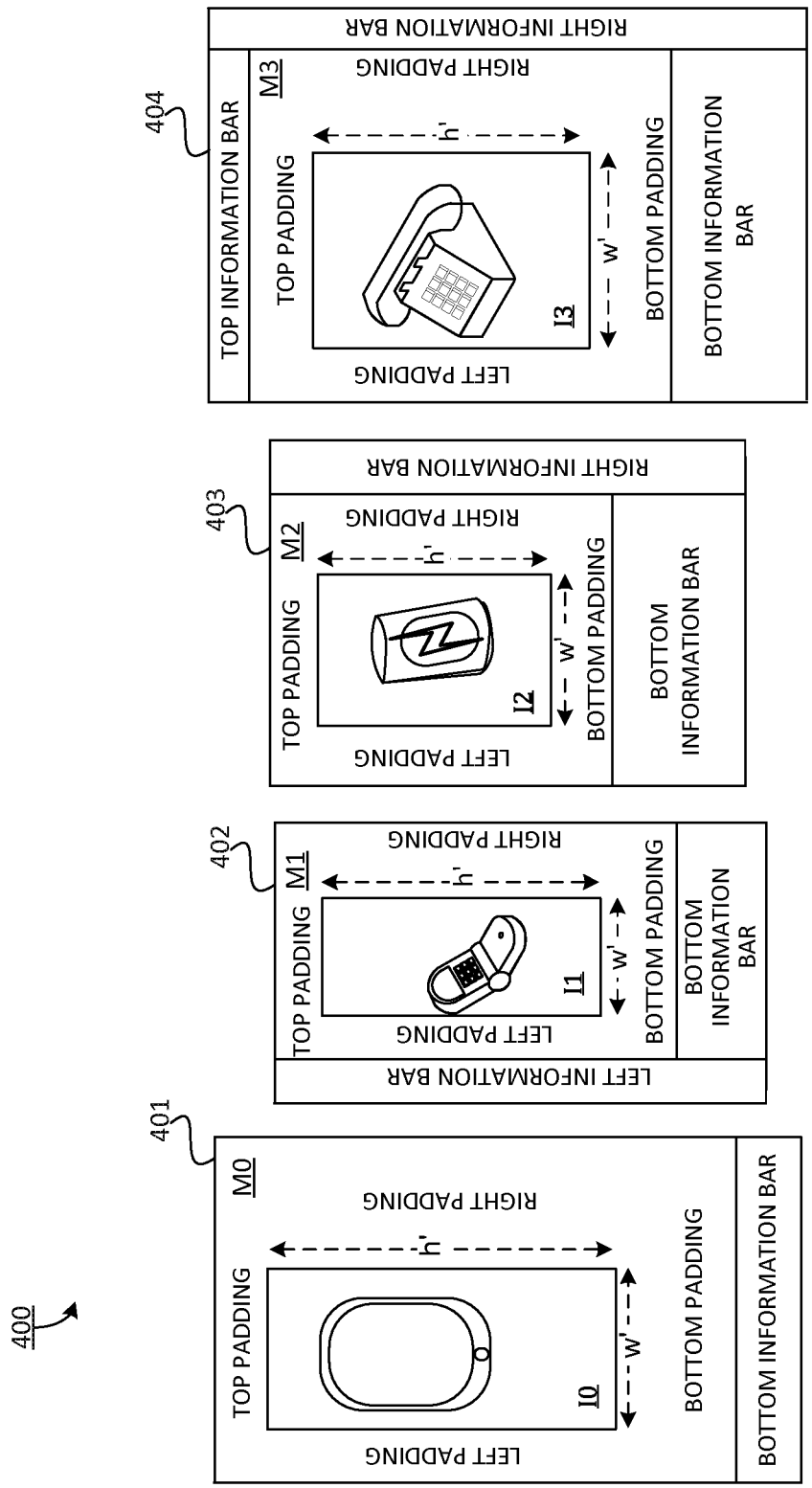
FIG. 4 is a block diagram showing example image modules having different size dimensions.

As shown in the example of FIG. 4, in their unscaled states, image modules 401 to 404 may have different sizes, e.g., different heights and/or widths. The processes described herein may be used to scale various image modules to fit within a row having a specified width, to fit within a column having a specified height, to fit within a set of rows having a specified height, or to fit within a set of columns having a specified width. The processes scale the scalable parts of the image modules using, e.g., corresponding scaling factors. The scaling factors, however, are not applied to the unscalable parts in the examples described herein.

The scaling factors for a set of image modules may be determined, e.g., by generating linear equations that relate width and/or height components of the corresponding image modules. In the linear equations, the scaling factors, which are the unknowns, are multiplied by corresponding dimensions of the scalable parts of the image modules. The linear equations are then solved for these scaling factors. For each set of N (where N is an integer greater than one) scaling factors, N equations are generated. So, for example, if there are five image modules to be scaled, five scaling factors are determined. Accordingly, five linear equations are generated, which can be solved to obtain the scaling factors. An example implementation for generating such equations is as follows.

In this example implementation, image modules for an electronic circular may be rendered in a rectangular viewport, e.g., the display screen of a computing device. One dimension of the viewport, e.g., its width, may be fixed, while another dimension, e.g., its height, may be flexible. For example, the height of a viewport may be flexible in the sense that pages can be scrolled from top to bottom (or bottom to top) of the viewport. In another example, if pages can scroll from left to right (or right to left), the height of the viewport may be deemed to be fixed, whereas the width of the viewport maybe deemed to be flexible.

Accordingly, the scaling processes described herein may be performed in a fixed row mode, in which the width of each row is about the same (e.g., a fixed row width), or in a fixed column mode, in which the height of each column is about the same (e.g., a fixed column height). The processes described herein may generate scaling factors to scale images modules to meet the fixed row width or the fixed column height. The example equations shown below are specific to the fixed row width case; however, similar equations can be generated for the fixed column height case by replacing variables associated with row width with corresponding variables associated with column height, and vice versa.

In this example, the row width is a system constraint that is specified before system processing (e.g., by an advertiser), and the image modules are scaled to meet this specified row width. In this example, a row width of W is specified. The scaling process is executed to scale image modules in several such rows so that each row has an equal width W, and such that image modules in a same row have equal heights. The scaled rows may then be arranged adjacent to each other.

In FIG. 4, images, I0, I1 . . . In, are included in corresponding image modules M0, M1 . . . Mn. The width (w'n) and height (h'n) of each of the images I0, I1 . . . In is represented as (w'0, h'0) (w'1, h'1) . . . (w'n, h'n). In some implementations, dimensions noted herein are measured in terms of pixels; however, other units of measurement may be used.

Figure 5:
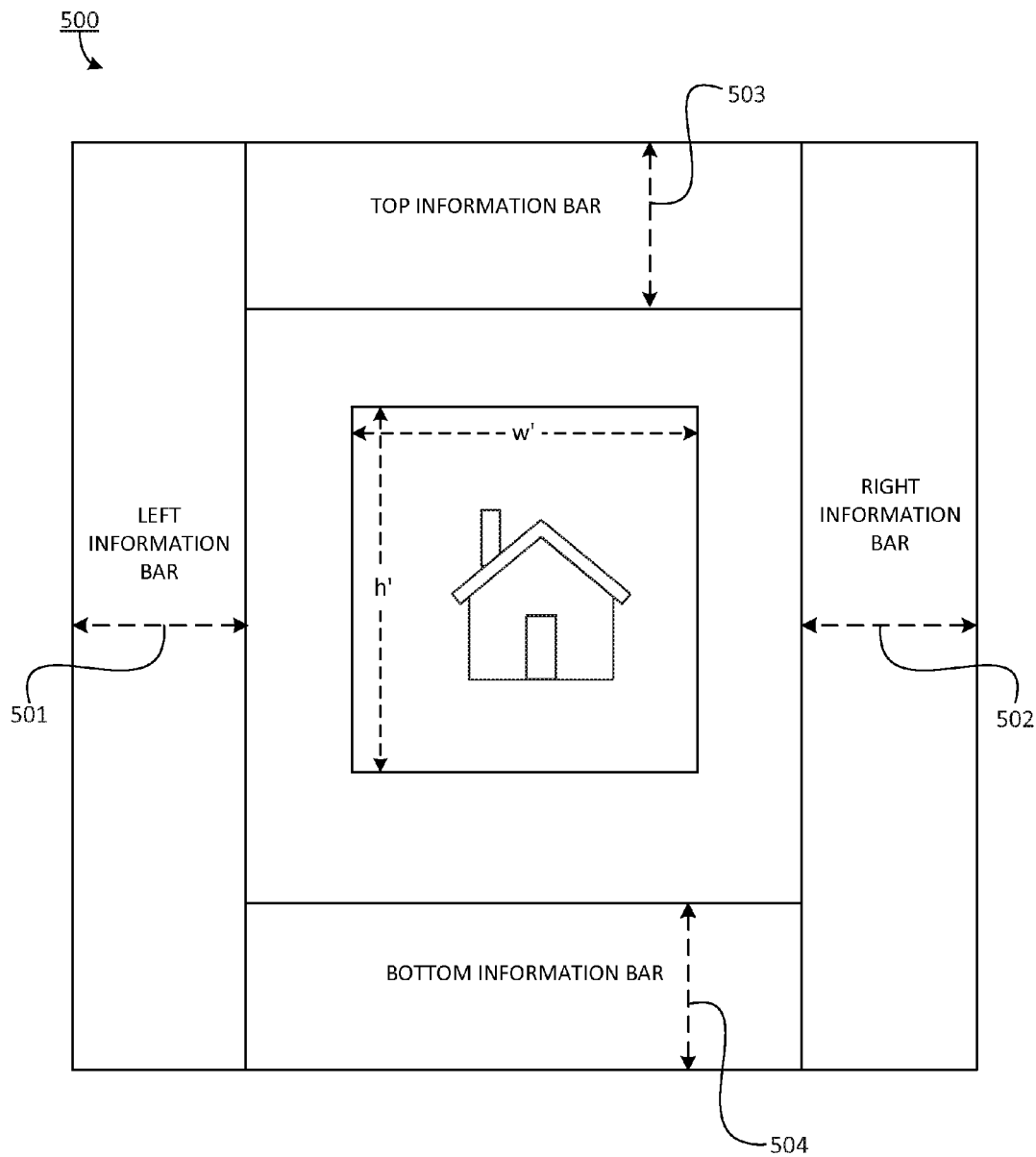

The dimensions of the information bars, if present, in each image module are determined. The dimensions include the width of information bars in each image module. Referring to FIG. 5, this width, called the total information bar width (TIBW), is determined by summing the widths of information bars in the module. Thus, in image module 500, TIBW is a sum of the widths of a left information bar 501 and a right information bar 502. The height of information bars in each image module is also determined. This height, called the total information bar height (TIBH), is a sum of heights of information bars in the module. Thus, for image module 500, TIBH is a sum of the heights of a top information bar 503 and a bottom information bar 504. In this example, information bars are not scalable; accordingly, TIBW represents the sum total information bar width and TIBH represents the sum total information bar height. Some image modules may not contain information bars at the top, bottom, left and right. In these cases, the corresponding width or height of a missing information bar is designated as zero.

The dimensions of the padding, if present, in each image module are determined. In this example, padding can be unscalable (absolute) or scalable (proportional—e.g., a left padding is 20% of image width). Accordingly, the dimensions of the padding are divided into two parts: a dimension for the scalable padding, if present, and a dimension for the unscalable padding, if present. In this regard, some image modules may not contain padding at the top, bottom, left and right. In these cases, the corresponding width or height of missing padding is designated as zero.

Figure 6:
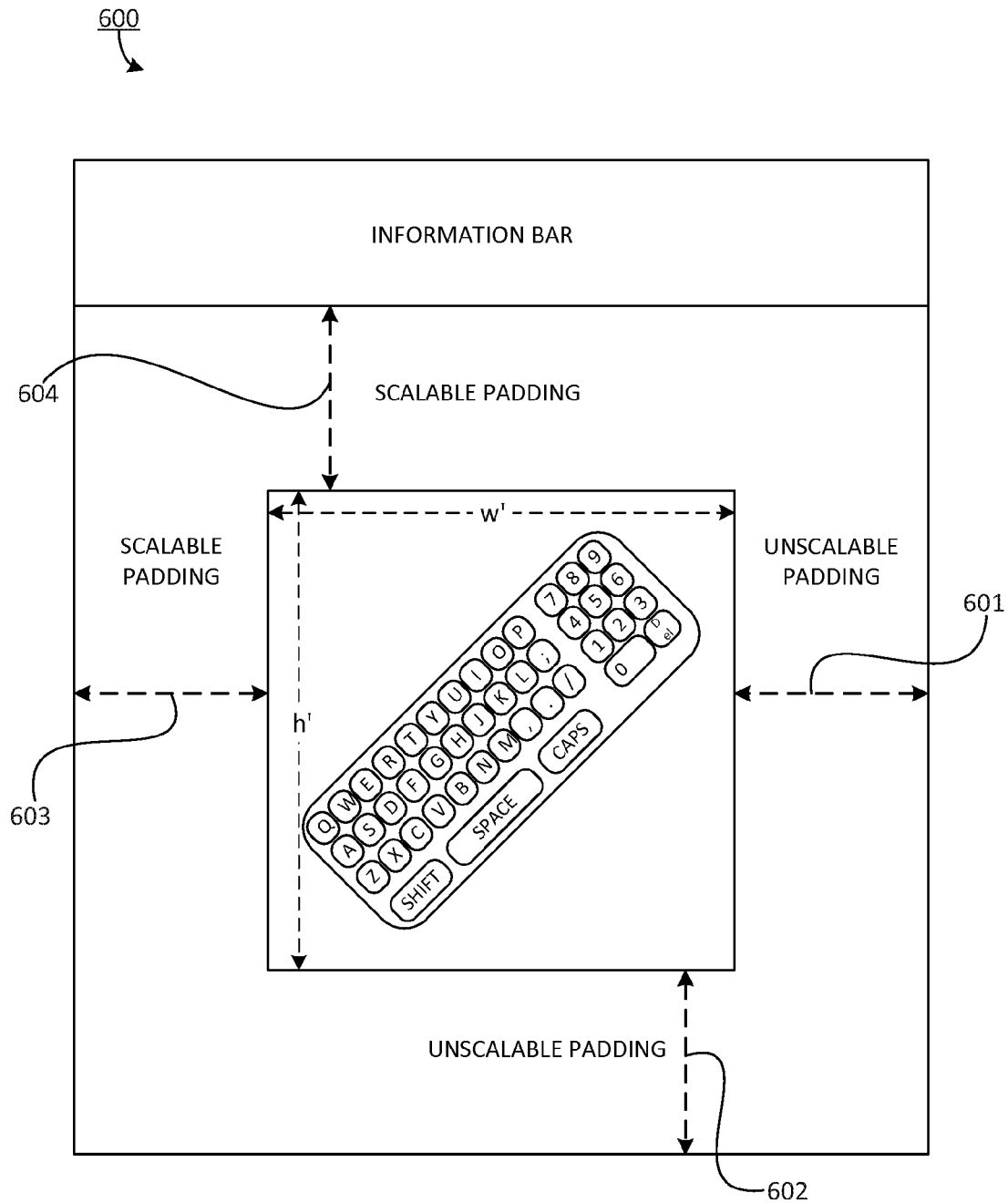

The width of the unscalable padding is determined. Referring to FIG. 6, this width, called total absolute padding width (TAPW), is a sum of widths of unscalable padding in an image module. Thus, for example, in image module 600, TAPW is a sum of the widths of a right unscalable padding 601 (if present) and a left unscalable padding (not present in this example). The height of the unscalable padding is also determined. This height, called the total absolute padding height (TAPH), is a sum of heights of unscalable padding in the module. Thus, in image module 600, TAPH is a sum of the height of a top unscalable padding (not present in this example) and bottom unscalable padding 602.

The width of the scalable padding is determined, and the height of the scalable padding is determined. The width is called the total proportional padding width (TPPW) and the height is called the total proportional padding height (TPPH). TPPW and TPPH are determined in a manner similar to the manner in which TAPW and TAPH were determined above. For example, in image module 600, TPPW is the sum of widths of left scalable padding 603 and a right scalable padding (not present in this example). In image module 600, TPPH is the sum of the height of top scalable padding 604 and a bottom scalable padding (not present in this example).

In examples where the information bar can be scalable, the information bar components can be broken-down, and processed, in a manner similar to that described above for the padding components.

Total dimensions for the scalable and unscalable widths and heights, if present, in each image module are determined. The unscalable width dimension, which is called the absolute size component for module width (ASCW), is defined as TIBW+TAPW, e.g., the total information bar width (since, in this example, the information bar is unscalable) plus the total absolute padding width. The unscalable height dimension, which is called the absolute size component for module height (ASCH), is defined as TIBH+TAPH, e.g., the total information bar height plus the total absolute padding height. The scalable width dimension, which is called the scalable size component for module width (SSCW), is defined as w'n+TPPW, e.g., the image width plus the total proportional padding width (both of which are scalable components). The scalable height dimension, which is called the scalable size component for module width (SSCH), is defined as h'n+ TPPH, e.g., the image height plus the total proportional padding height (both of which are scalable components).

SSCW, SSCH, ASCW and ASCH may be renamed as follows:
  $w_n$=SSCWn (scalable width component)
  $h_n$=SSCHn (scalable height component)
  $a_n$=ASCWn (unscalable width component)
  $b_n$=ASCHn (unscalable height component)

Figure 7:
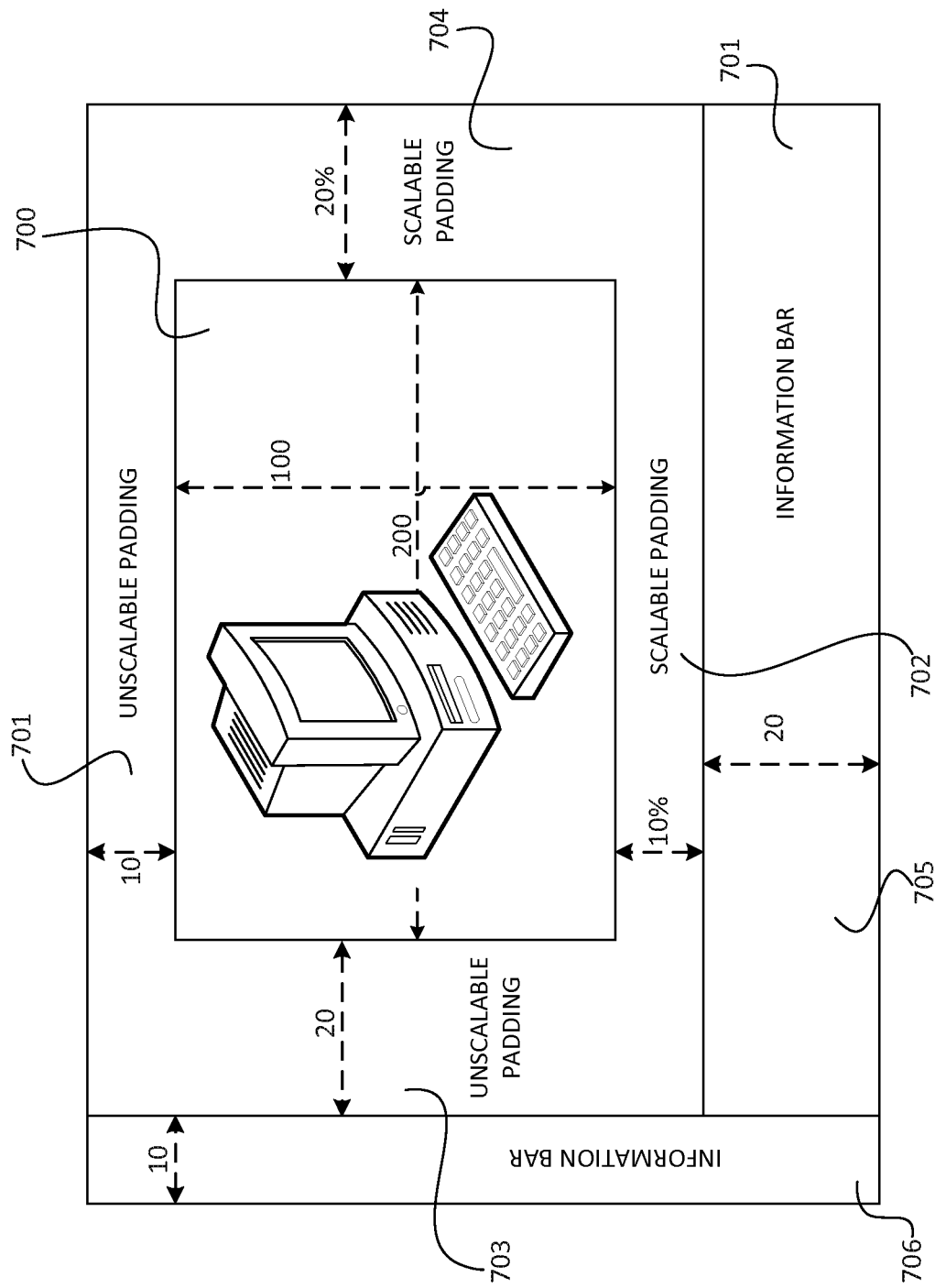

By way of example, referring to FIG. 7, image 700 is 200 pixels wide (w') by 100 pixels tall (h'), and has a top unscalable padding 701 of 10 pixels, and a bottom scalable padding 702 that is 10% of the size of image 700. Image 700 also has a left unscalable padding 703 that is 20 pixels wide and a right scalable padding 704 that is 20% of the size of image 700. Bottom information bar 705 has an unscalable height of 20 pixels, and left information bar 708 has an unscalable width of 10 pixels. Accordingly, in this example:
  w'=200
  h'=100
  MW=10

TIBH=20
TAPW=20
TAPH=10
TPPW=200*20%=40
TPPH=100*10%=10
a=ASCW=TIBW+TAPW=10+20=30
b=ASCH=TIBH+TAPH=20+10=30
w=SSCW=w'+TPPW=200+40=240
h=SSCH=h'+TPPH=100+10=110

In some cases, one or more of an or bn may have a zero value. For example, if an image module has no unscalable width components, then an will have a value of zero for that image module.

As noted above, equations may be generated that include, and that may be used to solve for, a scaling factor (x0, x1 ... xn) that is applied to each corresponding image module to scale the scalable parts of that image module. Using the scaling factors, the image modules can be scaled to meet the specified constraint (in this case, a row width of W).

In this example, a first equation (1) is generated to specify that widths of the image modules under consideration—both scalable (wn) and unscalable (an) widths—sum to W. In this example, the image modules under consideration are image modules in a single row, e.g., row 400 of FIG. 4. In the example equation below, the scaling factor "xn" is multiplied by each scalable width (wn), but not by the unscalable widths (an) (since those unscalable widths are not scaled).

$$w0*x0+a0+w1*x1+a1+\ldots+wn*xn+an=W \quad (1)$$

In this example, the following second equations (2) are generated, which equate the heights of image modules in a row under consideration. In other words, the equations reflect that each image module in a single row is to have the same height. This may be a system constraint that is specified before system processing. In the examples below, the scaling factor "xn" is multiplied by each scalable height (hn), but not by the unscalable heights (bn) (since those unscalable heights are not scaled).

$$h0*x0+b0=h1*x1+b1 \text{ (height for module } M0=M1\text{)}$$

$$h1*x1+b1=h2*x2+b2 \text{ (height for module } M1=M2\text{)}$$

$$\ldots$$

$$h'(n-1)*x(n-1)+b(n-1)=hn*xn+bn \text{ EQ\#}(n-1)' \text{ (height for module } M1=M(n-1)) \quad (2)$$

Rearranging equations (1) and (2) above yields the following "n" equations with "n" unknowns:

$$w0*x0+w1*x1+w'2*x2+\ldots+wn*xn=W-a0-a1-\ldots an(0)$$

$$h0*x0-h1*x1=b1-b0(1)$$

$$h1*x1-h'2*x2=b2-b1(2).$$

$$\ldots$$

$$h(n-1)*x(n-1)-hn*xn=bn-b(n-1)(n-1) \quad (3)$$

Equations (3) represent a linear equation system of the form [A]*[X]=[B], which is solvable for a vector [X] containing the scaling factors (x0, x1 ... xn).

After the scaling factors (x0, x1 ... xn) are determined, the scaling factors are applied to the scalable parts of the image modules, thereby producing scaled images. For example, the scalable components of a first image module 401 are multiplied by x0; the scalable components of a second image module 402 are multiplied by x1, and so forth. In this example, the scaling factors are not applied to the unscalable components of the corresponding images modules, since those parts of the image modules are not scaled Following scaling, the resulting scaled images are rendered in a row having width W. In this example, a row 800 has a width W, as shown, e.g., in FIG. 8. Row 800 may be combined with other rows (not shown), e.g., arranged vertically, during rendering to generate an electronic circular that meets the initial constraints (e.g., number of rows, number of modules per row, and row width W for the rows).

Figure 8:
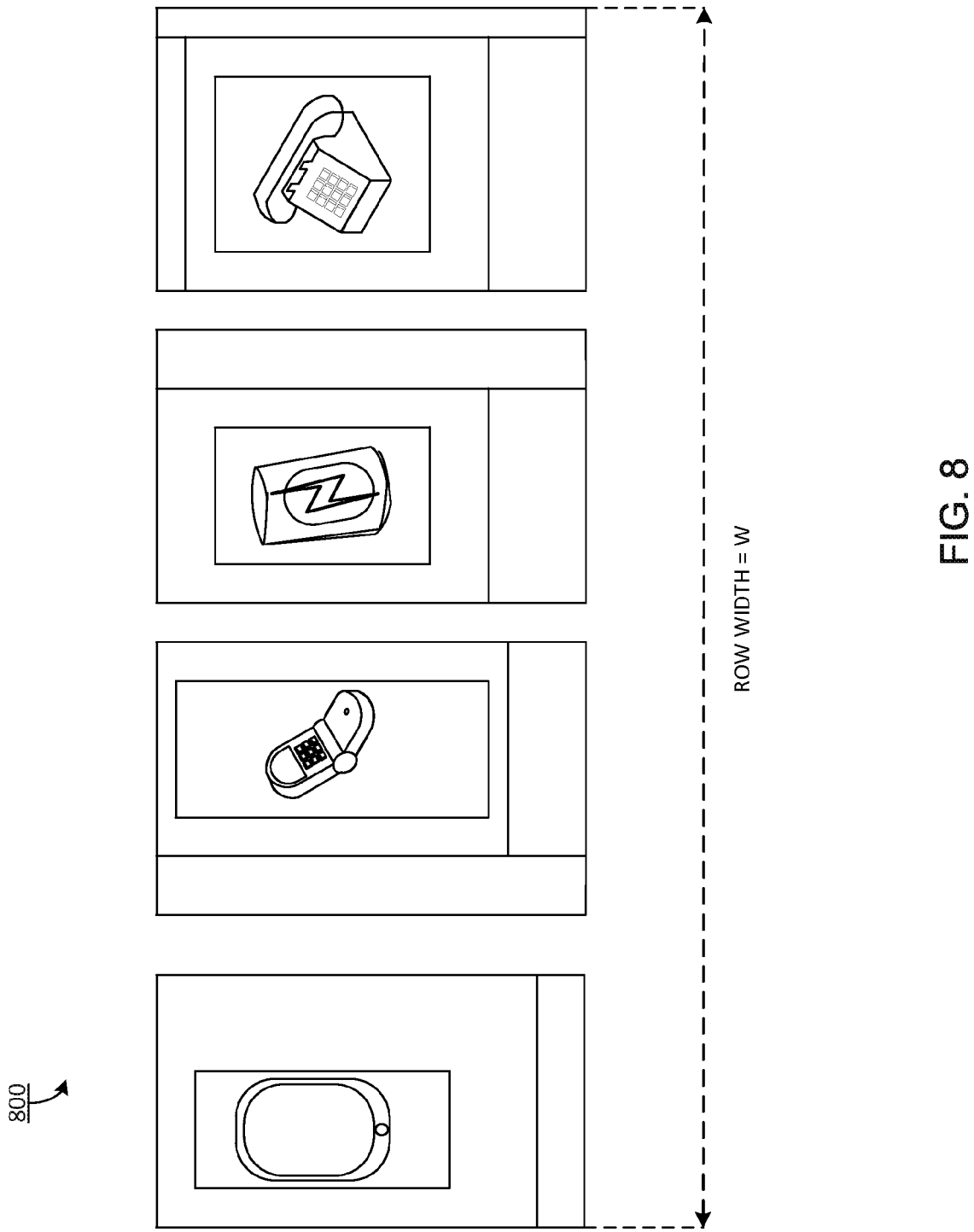
FIG. 8 is a block diagram showing the example image modules of FIG. 4 after scaling.
Figure 9:
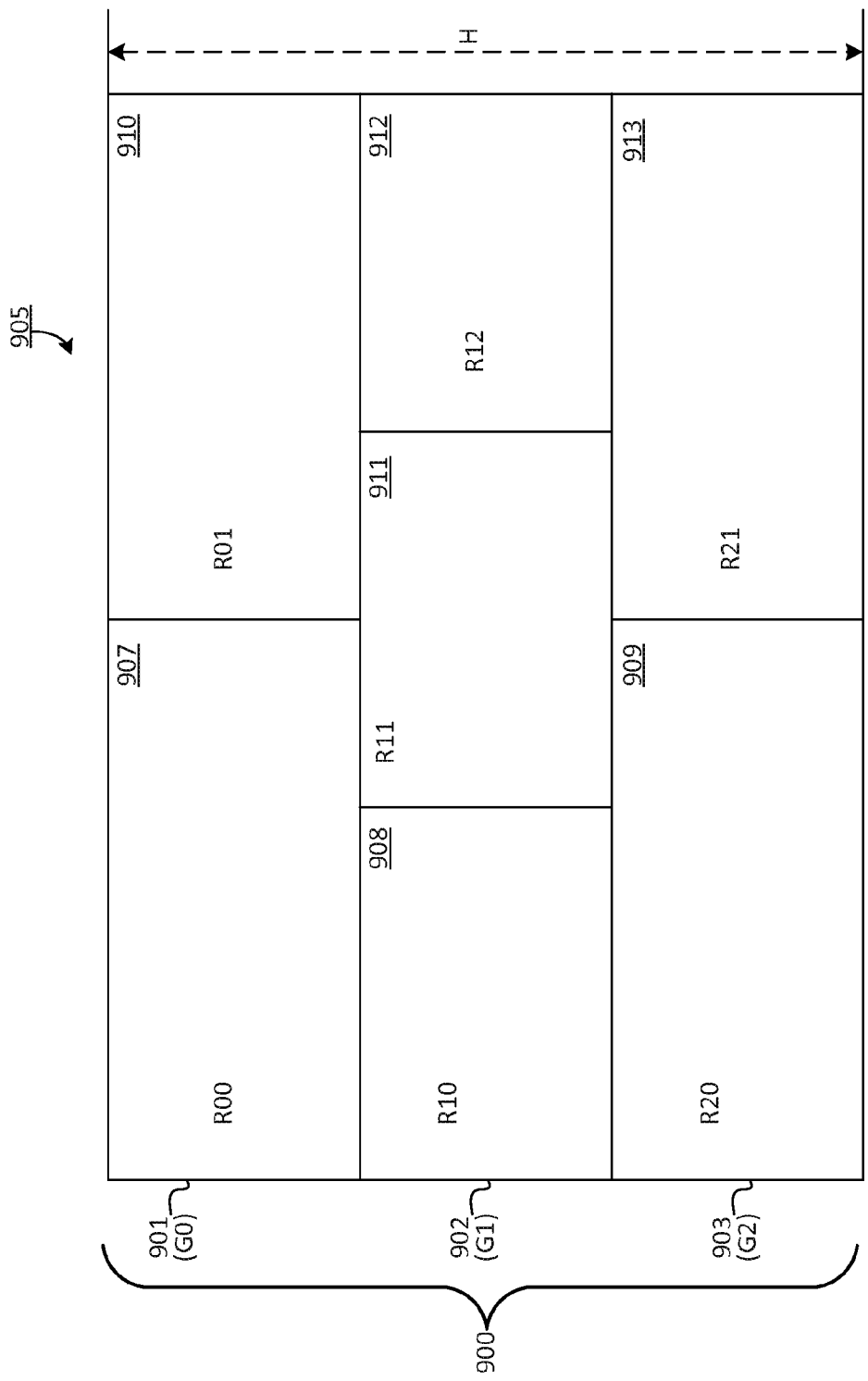
FIG. 9 is a block diagram of an example template for image modules.

In another example implementation, instead of constraining row width, the height of a set of rows is constrained, e.g., to a fixed height, H, as shown in FIG. 9. In the example of FIG. 8, where row width was constrained, a system of equations was generated for each separate row, and then solved for the appropriate scaling factors. In this example, however, image modules from different rows are considered. In this example, therefore, size components of image modules in different rows are part of the same system of equations.

The example equations generated below are specific to the fixed row height case; however, similar equations can be generated for a fixed column width case by replacing variables associated with row height with corresponding variables associated with column width, and vice versa.

Referring to FIG. 9, this example scales differently-sized image modules (not shown) to fit a template having three rows: row G0 901 having two image modules; row G1 902 having three image modules; and row G2 903 having two image modules. Whereas in the first example, the system constraint was a row or set of rows having fixed width of W, in the following example, the three rows 900 that make up the electronic circular are constrained to have the sum of their height equal to H. In this example, the rows 900 are arranged vertically to produce a fixed height H. Accordingly, in this example, there are seven unknown scaling factors (one scaling factor for each of the seven image modules in the template). Therefore, the process described herein generates seven equations, and solves those seven equations to determine the seven scaling factors. The equations are generated as follows.

To begin, in the notation "RXY", X refers to the $X^{th}$ row and Y refers to the $Y^{th}$ module in the $X^{th}$ row. So, in example template 905, first row 901 (G0) includes modules R00 and R01. Second row 902 (G1) includes modules R10, R11, and R12. Third row 903 (G2) includes modules R20 and R21. The equations generated in this example process are solved for the following scaling factors: x00, x01, x10, x11, x12, x20, x21 (where x00 refers to the scaling factor for the first row, first image module; x01 refers to the scaling factor for the first row, second image module; x10 refers to the scaling factor for the second row, first image module, and so forth).

In this example, the image modules within each corresponding row include the following size components, where w, h, a and b are as defined above, e.g., w is scalable width, h is scalable height, a is unscalable width, and b is unscalable height.

Row G0:
module R00
  scalable size components (w00, h00)
  unscalable size components (a00, b00)
module R01
  scalable size components (w01, h01),
  unscalable size components (a01, b01)
Row G1
module R10
  scalable size components (w10, h10)
  unscalable size components (a10, b10)

module R11
    scalable size components (w11, h11)
    unscalable size components (a11, b11)
module R12
    scalable size components (w12, h12)
    unscalable size components (a12, b12)
Row G2
module R20
    scalable size component (w20, h20)
    unscalable size component (a20, b20)
module R21
    scalable size component (w21, h21)
    unscalable size component (a21, b21)

In this example, each row is deemed to have the same width. This may be a system constraint that may be set before system processing. Accordingly, the widths of the various rows can be equated to each other, as follows:

$$\text{Width}(G0) = \text{Width}(G1)(w0)$$

$$\text{Width}(G1) = \text{Width}(G2)(w1) \quad (4)$$

Equations (4) translate into the following:

$$w00*x00+b00+w01*x01+b01 = w10*x10+b10+ \\ w11*x11+b11+w12*x12+b12$$

$$w10*x10+b10+w11*x11+b11+w12*x12+ \\ b12 = w20*x20+b20+w21*x21+b21 \quad (5)$$

As was the case in equations (2) above, in equations (5), the scaling factors are applied to the scalable parts of the image modules, but not to the unscalable parts. Equations (5) can be rearranged into equations (6) below.

$$w00*x00+w01*x01-w10*x10-h11*x11- \\ w12*x12 = b11+b12-b00-b01-b10$$

$$w10*x10+w11*x11+w12*x12-h20*x20- \\ w21*x21 = b20+b21-b10-b11-b12 \quad (6)$$

In each row 901 to 903, the image modules have the same height. This is also a system constraint that may be set before system processing. Accordingly, the heights of image modules in individual rows can be equated as follows:

Row $G0$:

$$h00*x00+a00 = h01*x01+a01 \text{ (height for module} \\ 907 = \text{module } 910) \quad (7)$$

Row $G1$:

$$h10*x00+a10 = h11*x11+a11 \text{ (height for module} \\ 908 = \text{module } 911)$$

$$h11*x01+a11 = h12*x12+a12 \text{ (height for module} \\ 911 = \text{module } 912) \quad (8)$$

Row $G2$:

$$h20*x20+a20 = h21*x01+a21 \text{ (height for module} \\ 909 = \text{module } 913) \quad (9)$$

Equations (6) to (9) include six linear equations in total. The overall height constraint, H, is used to generate the seventh equation, as follows. Image modules in a same row will have the same height, as noted above. Accordingly, in this example, an module from each row is selected (e.g., the first image modules 907, 908, 909 from each row), and their heights are summed and equated to H with appropriate scaling factors applied, as shown in equation (10) below.

$$h00*x00+a00+h10*x00+a10+h20*x20+a20 = H \quad (10)$$

Equations (6) to (10) can be rearranged to represent a linear system of equations of the type [A]*[X]=[B], which is solvable for a vector [X] that includes scaling factors (x00, x01 . . . x21)

After the scaling factors are determined, they are applied to the scalable parts of the image modules, thereby producing scaled images. For example, the scalable components of a first image module 907 in first row 901 are multiplied by x00; the scalable components of a second image module 910 in first row 901 are multiplied by x01, and so forth. In this example, the scaling factors are not applied to the unscalable components of the corresponding images modules. Following scaling, the resulting scaled images are rendered in a template having height H, as shown, e.g., in FIG. 9.

The process described with respect to FIGS. 1 and 9 may be implemented in an appropriate network environment, with appropriate devices and computing equipment. An example of such an environment is described below.

Figure 10:
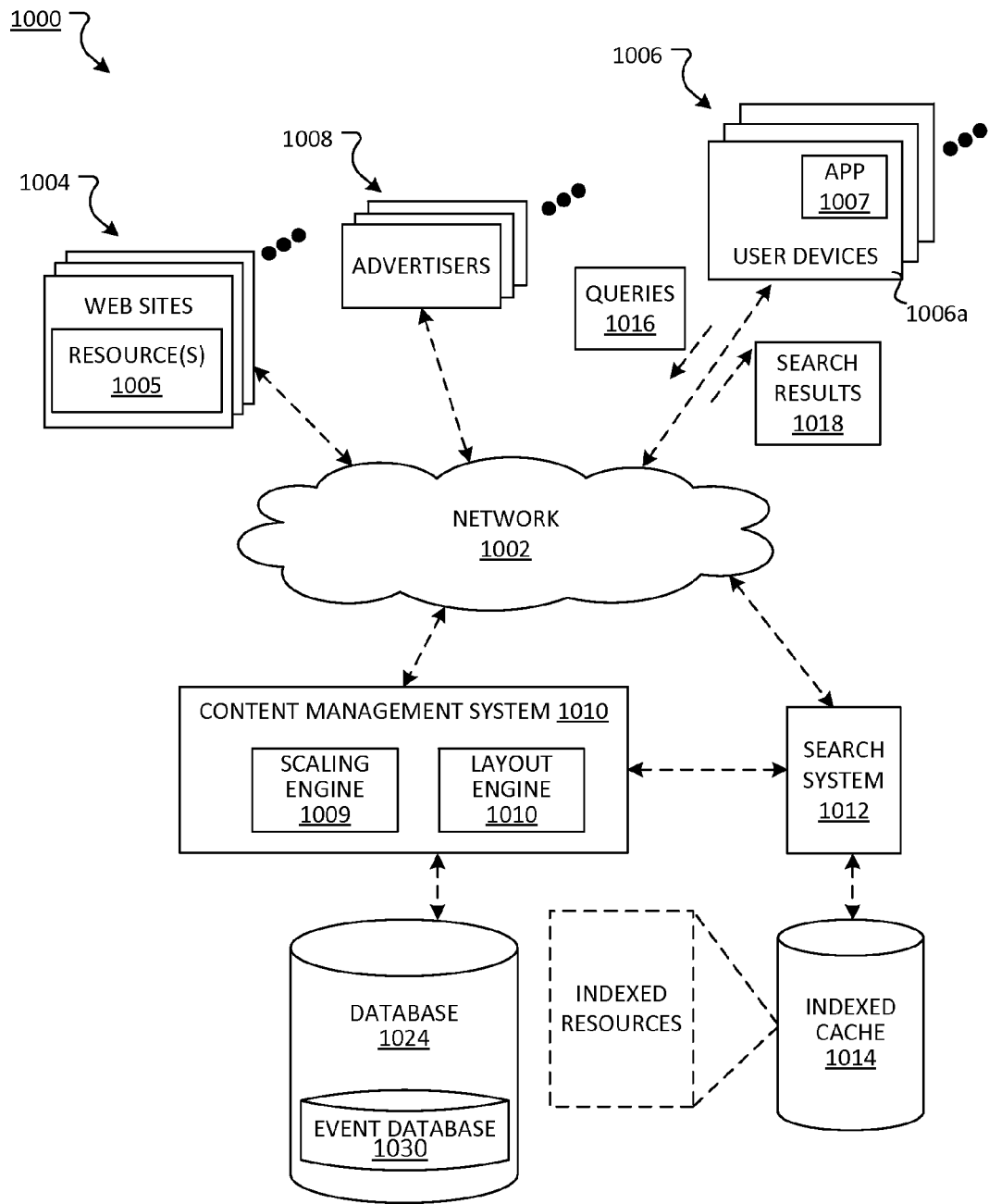
FIG. 10 is a block diagram of an example network environment on which the processes described herein for scaling image modules may be implemented.

FIG. 10 is a block diagram of an example environment 1000 that includes a network 1002. Network 1002 can represent a communications network that can allow devices, e.g., a user device 1006a, to communicate with entities on the network through a communication interface (not shown), which may include digital signal processing circuitry. Network 1002 can include one or more networks. The network(s) may provide for communications under various modes or protocols, e.g., Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver. In addition, short-range communication may occur, e.g., using a Bluetooth, WiFi, or other such transceiver.

Network 1002 connects various entities, e.g., Web sites 1004, user devices 1006, content providers (e.g., advertisers 1008), publishers, and a content management system 1010. In this regard, example environment 1000 may include many thousands of Web sites 1004, user devices 1006, and content providers (e.g., advertisers 1008). Entities connected to network 1002 include and/or connect through one or more servers. Each such server may be one or more of various forms of servers, e.g., a Web server, an application server, a proxy server, a network server, or a server farm. Each server can include one or more processing devices, memory, and a storage system.

In FIG. 10, Web sites 1004 may include one or more resources 1005 associated with a domain name and hosted by one or more servers. An example Web site is a collection of Web pages formatted in hypertext markup language (HTML) that can contain text, images, multimedia content, and programming elements, e.g., scripts. Each Web site 1004 can be maintained by a content publisher, which is an entity that controls, manages and/or owns the Web site 1004.

A resource 1005 may be appropriate data that can be provided over network 1002. A resource 1005 can be identified by a resource address that is associated with the resource 1005. Resources 1005 can include HTML pages, word processing documents, portable document format (PDF) documents, images, video, and news feed sources, to name only a few. Resources 1005 can include content, e.g., words, phrases, images and sounds, that may include embedded information (e.g., meta-information hyperlinks) and/or embedded instructions (e.g., JavaScript scripts).

To facilitate searching of resources 1005, environment 1000 can include a search system 1012 that identifies the resources 1005 by crawling and indexing the resources 1005 provided by the content publishers on the Web sites 1004. Data about the resources 1005 can be indexed based on the resource 1005 to which the data corresponds. The indexed and, optionally, cached copies of the resources 1005 can be stored in an indexed cache 1014.

An example user device 1006a is an electronic device that is under control of a user and that is capable of requesting and receiving resources over the network 1002. A user device may include one or more processing devices, and may be, or include, a mobile telephone (e.g., a smartphone), a laptop computer, a handheld computer, a tablet computer, a network appliance, a camera, an enhanced general packet radio service (EGPRS) mobile phone, a media player, a navigation device, an email device, a game console, or a combination of two or more of these data processing devices or other data processing devices. In some implementations, the user device can be included as part of a motor vehicle (e.g., an automobile, an emergency vehicle (e.g., fire truck, ambulance), a bus).

User device 1006a typically stores one or more user applications, e.g., a Web browser, to facilitate the sending and receiving of data over the network 1002. User device 1006a can request resources 1005 from a Web site 1004a. In turn, data representing the resource 1005 can be provided to the user device 1006a for presentation by the user device 1006a. User devices 1006 can also submit search queries 1016 to the search system 1012 over the network 1002. A request for a resource 1005 or a search query 1016 sent from a user device 1006 can include an identifier, e.g., a cookie, identifying the user of the user device.

In response to a search query 1016, the search system 1012 can access the indexed cache 1014 to identify resources 1005 that are relevant to the search query 1016. The search system 1012 identifies the resources 1005 in the form of search results 1018 and returns the search results 1018 to a user device 1006 in search results pages. A search result 1018 may be data generated by the search system 1012 that identifies a resource 1005 that is responsive to a particular search query 1016, and includes a link to the resource 1005. An example search result 1018 can include a Web page title, a snippet of text or a portion of an image extracted from the Web page, and the URL (Unified Resource Location) of the Web page.

Content management system 1010 may be used for selecting, generating, and providing content in response to requests for content. For example, a scaling engine 1109, which may be part of content management system 1010, may perform operations to scale image modules by solving for scaling factors using equations like (1) to (10) above, and applying those scaling factors to appropriate parts of image module. A layout engine 1110, which may also be part of content management system 1010, may perform operations to generate electronic circulars by combining the scaled images.

Content management system 1010 also can maintain a database 1024 based on activity of a user. In this regard, the database 1024 can store a profile for the user which includes, for example, information about past user activities, e.g., visits to a place or event, past requests for resources 1005, past search queries 1016, other requests for content, Web sites visited, or interactions with content. In some implementations, the information in database 1024 can be derived, for example, from one or more of a query log, an advertisement log, or requests for content. The database 1024 can include, for each entry, a cookie identifying the user, a timestamp, an IP (Internet Protocol) address associated with a requesting user device 1006, a type of usage, and details associated with the usage.

In this example, the content management system 1010 can evaluate information in database 1024 to determine whether to target advertising to a user, e.g., to determine whether to send the user an electronic circular of the type generated by the processes described herein. The targeting information may take into account numerous factors including, but not limited to, historical search activities of the user including, e.g., search keywords used, particular content interacted with, sites visited by the user, etc.

When a resource 1005 or search results 1018 are requested by a user device 1006, content management system 1010 can receive a request for content to be provided with the resource 1005 or search results 1018. The request for content can include characteristics of one or more "slots" that are defined for the requested resource 1005 or search results page. For example, the data representing the resource 1005 can include data specifying a portion of the resource 1005 or a portion of a user display, e.g., a presentation location of a pop-up window or a slot of a third-party content site or Web page, in which content can be presented. An example slot is an ad slot. Search results pages can also include one or more slots in which other content items (e.g., ads) can be presented.

In an example, an ad slot may be filled with an image link to an electronic circular generated according to the processes described herein. In other examples, electronic circulars may be sent to a user through other channels, e.g., the electronic circular may be sent by e-mail or through social media.

Information about slots can be provided to content management system 1010. For example, a reference (e.g., URL) to the resource for which the slot is defined, a size of the slot, and/or media types that are available for presentation in the slot can be provided to the content management system 1010. Similarly, search request content (e.g., key words, images, audio, video or the like) associated with a requested resource ("resource keywords") or a search query 1016 for which search results are requested can also be provided to the content management system 1010 to facilitate identification of content that is relevant to the resource or search query 1016.

Based at least in part on data included in the request, the content management system 1010 can select content that is eligible to be provided in response to the request ("eligible content items"). For example, eligible content items can be eligible ads having characteristics matching the characteristics of ad slots and that are identified as relevant to user interests, e.g., an electronic circular. In some implementations, the universe of eligible content items (e.g., advertisements) can be narrowed by taking into account other factors, e.g., specified resource keywords or previous search queries 1016. For example, content items corresponding to historical search activities of the user including, e.g., search keywords used, particular content interacted with, sites visited by the user, etc. may also be used in the selection of eligible content items by the content management system 1010.

Content management system 1010 can select the eligible content items that are to be provided for presentation in slots of a resource 1005 or search results page 1018 based, at least in part, on results of an auction. For example, for eligible content items, content management system 1010 can receive bids from content providers (e.g., advertisers 1008) and allocate slots, based at least in part on the received bids (e.g., based on the highest bidders at the conclusion of the auction). The bids are amounts that the content providers are willing to pay for presentation (or selection) of their content with a resource 1005 or search results page 1018. For example, a bid can specify an amount that a content provider is willing to pay for each 1000 impressions (i.e., presentations) of the content item, referred to as a CPM bid. Alternatively, the bid can specify an amount that the content provider (e.g., a publisher of an electronic circular) is willing to pay for a selection (i.e., a click-through) of the content item or a conversion following selection of the content item. The selected content item can be determined based on the bids alone, or based on the bids of each bidder being multiplied by one or more factors, e.g., quality scores derived from content performance, landing page scores, and/or other factors.

Figure 11:
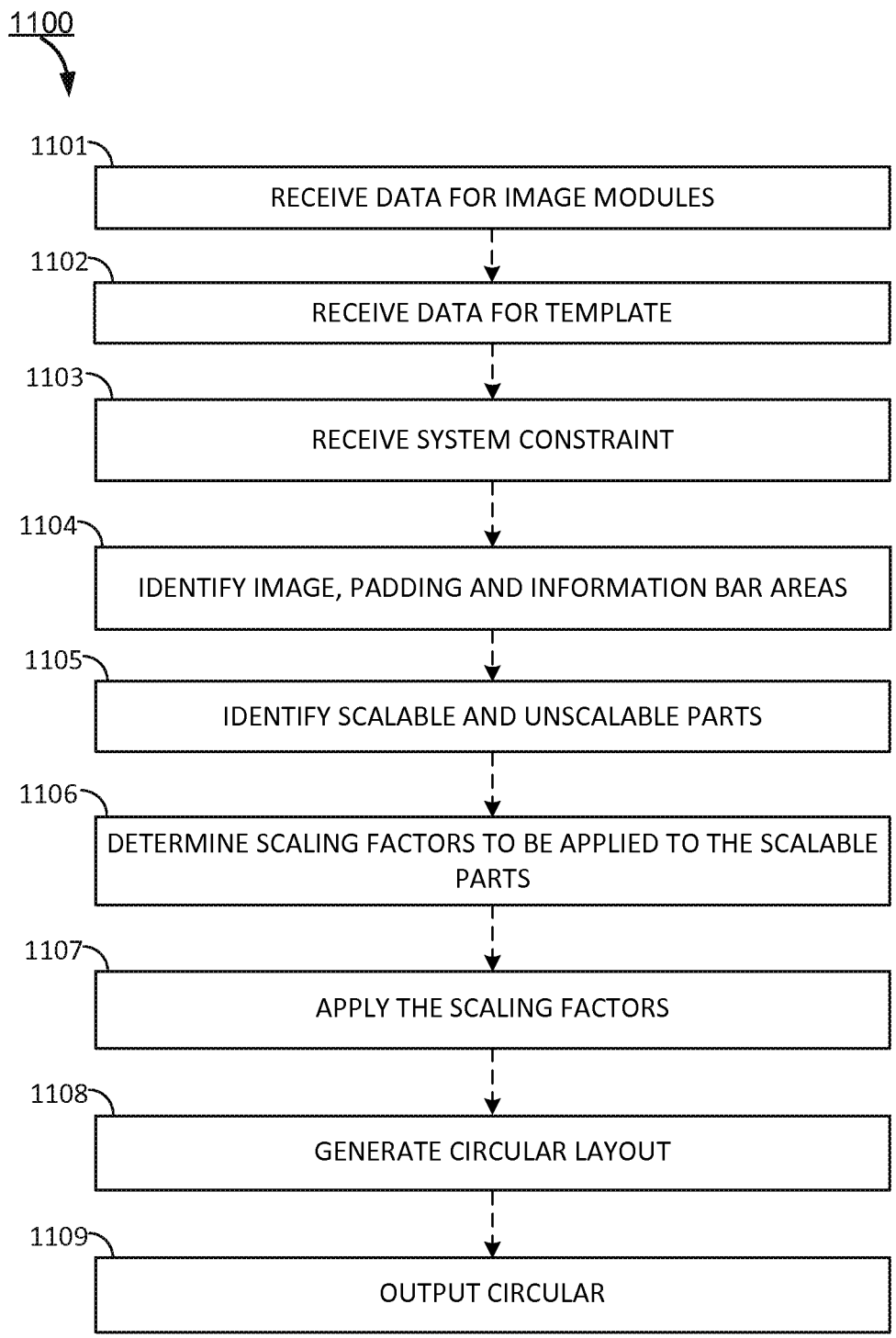
FIG. 11 is a flowchart showing an example process for scaling image modules.

FIG. 11 is a flowchart showing a process 1100, which may be performed, e.g., by scaling engine 1109 and layout engine 1110 in content management system 1010 (FIG. 10) in connection with search system 1012.

Process 1100 includes receiving (1101) data for image modules to be included in a template (e.g., for an electronic circular), and receiving (1102) data specifying a construction of the template. The data may be received, e.g., from a publisher of an electronic circular. The data specifying the construction of the template may include, e.g., the number of rows or columns, the number of modules per row or column, and which modules are to be included in which rows or columns.

Process 1100 also receives (1103) one or more system constraints. For example, process 1100 may receive information specifying that a template includes N (N>1) rows each having a fixed width, W. In another example, process 1100 may receive information specifying that a template includes N (N>1) rows, and that the N rows have a fixed height, H. Other constraints, examples of which are described above, may also be received.

For each image module, process 1100 identifies (1104) an image (if present), padding (if present), and information bars (if present). These parts of the image module may be associated with, e.g., metadata tags that identify those areas, and that specify values for those areas, e.g., to identify absolute or proportional widths or heights. Process 1100 also identifies (1105) scalable and unscalable parts of each image module. For example, process 1100 identifies which padding (if present) is scalable and which is not. In some examples, scalability may be part of the initial system constraints. For example, process 1100 may receive data indicating that images are scalable, but that scaling must preserve image aspect ratio. In other examples, the scalability or unscalability of an image module part may be specified in metadata associated with that part, or using other appropriate mechanisms.

Process 1100 determines (1106) scaling factors for the received image modules. For example, process 1100 may generate a system of linear equations, examples of which are equations (1) to (3) or (4) to (10) above, and solve those linear equations for the appropriate scaling factors.

Process 1100 applies (1107) the scaling factors to the appropriate image modules. In an example, process 1100 multiplies a value for each scalable component (e.g., a scalable height and/or width) by a corresponding scaling factor. The unscalable components (e.g., the absolute height and width) are not scaled. Application of the scaling factors produces scaled image modules of the type shown, e.g., in FIG. 8, in which the image modules meet the input constraint(s).

Process 1100 generates (1108) a layout for the electronic circular using the scaled image modules. For example, process 1100 places the scaled image modules in the format of the template specified above. Process 1100 outputs (1109) the resulting circular, e.g., in response to a search request.

Figure 12:
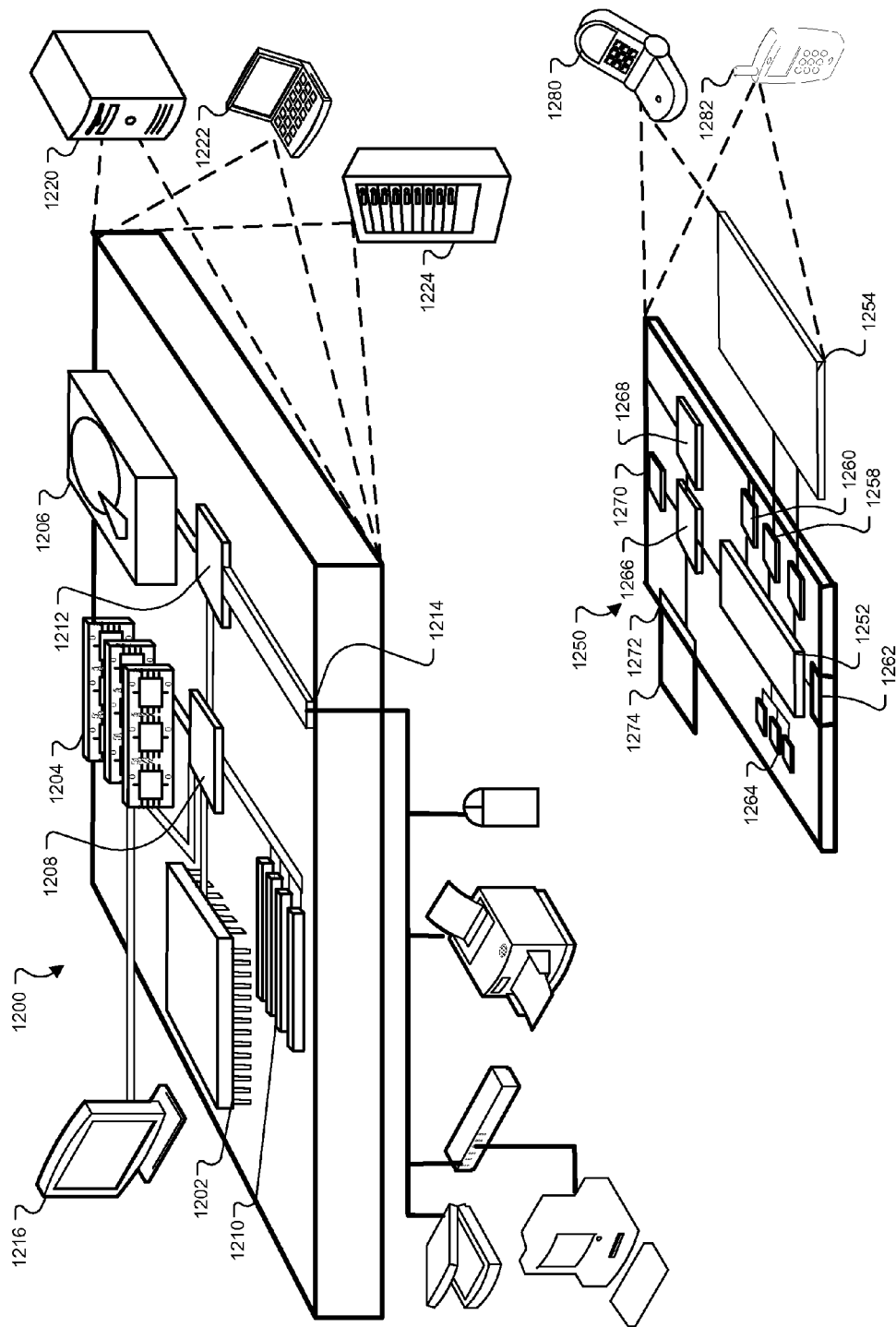
FIG. 12 shows examples of computing devices on which the processes described herein, or portions thereof, may be implemented.

FIG. 12 shows an example of a generic computing device 400 and a generic mobile computing device 1250, which may be used to implement the processes described herein, or portions thereof. For example, content management system 1010 and search system 1012 may be implemented by computing device 1200 and mobile computing device 1250 may implement a user device 1206 of FIG. 10.

Computing device 1200 is intended to represent various forms of digital computers, examples of which include laptops, desktops, workstations, personal digital assistants, servers, blade servers, mainframes, and other appropriate computers. Computing device 1250 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the technology described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, for example, display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, examples of which include a magnetic or optical disk.

The storage device 1206 is capable of providing mass storage for the computing device 1200. In one implementation, the storage device 1206 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 1204, the storage device 1206, or memory on processor 1202. For example, the information carrier may be a non-transitory, machine-readable storage medium.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer, e.g., a laptop computer 1222. Alternatively, components from computing device 1200 may be combined with other components in a mobile device (not shown), e.g., device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device, e.g. a display 1254, a communication interface 1266, and a transceiver 1268, among other components. The device 1250 may also be provided with a storage device, e.g., a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, e.g., control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may include appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 1264, expansion memory 1274, memory on processor 1252, or a propagated signal that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, e.g., using a Bluetooth, Wi-Fi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, e.g., through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smartphone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engine described herein can be separated, combined or incorporated into a single or combined engine. The engines depicted in the figures are not intended to limit the systems described herein to the software architectures shown therein.

For situations in which the systems and techniques discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

The processes described herein and variations thereof contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

In the foregoing examples, the aspect ratios of the images are maintained. However, in other examples, the image aspect ratios need not be maintained. Furthermore, the equations generated herein are not limited to use with the specific example templates shown or to the specific numbers of equations described in the examples. A system of N equations can be generated to solve for N scaling factors, where N is a number that is greater than or equal to two.

Other implementations not specifically described herein are also within the scope of the following claims.

What is claimed is:

1. A method performed by one or more processing devices, comprising:
  identifying scalable parts and unscalable parts of image modules that are to be scaled to fit within fixed dimensions;
  determining, using the one or more processing devices, scaling factors that are to be applied to the scalable parts of the image modules to scale the image modules;
  applying the scaling factors to the scalable parts of the images modules to produce scaled image modules that fit within the fixed dimensions, the unscalable parts being unaffected by the scaling factors; and
  generating data for displaying the scaled image modules on a computing device display screen;
  wherein each image module comprises:
    scalable parts and unscalable parts;
    absolute dimension components that include sums of a dimension of unscalable parts of the corresponding image module;
    scalable dimension components that include sums of dimensions of scalable parts of the corresponding image module; and
  wherein determining the scaling factors comprises the one or more processing devices performing operations comprising:
    generating a linear system of equations equating, to corresponding fixed dimensions, sums of absolute dimension components and scalable dimension components multiplied by corresponding scaling factors; and
    solving the linear system of equations for the scaling factors.

2. The method of claim 1, wherein each of the image modules comprises an image, the image being a scalable part.

3. The method of claim 2, wherein at least some of the image modules comprise an information bar, the information bar for displaying information relating a corresponding image, wherein, for each image module, the information bar is an unscalable part.

4. The method of claim 2, wherein at least some of the image modules comprise padding, the padding comprising pixels adjacent to a corresponding image and apart from the corresponding image, wherein for each image module, the padding is either a scalable part or an unscalable part.

5. The method of claim 1, wherein each image module comprises one or more of:
- an absolute height component that includes sums of heights of unscalable parts of the corresponding image module, the absolute height component being an absolute dimension component;
- an absolute width component that includes sums of widths of unscalable parts of the corresponding image module, the absolute width component being an absolute dimension component;
- a scalable height component that includes sums of heights of scalable parts of the corresponding image module, the scalable height component being a scalable dimension component; and
- a scalable width component that includes sums of widths of scalable parts of the corresponding image module, the scalable width component being a scalable dimension component; and
- wherein one or more of the absolute height component, the absolute width component, the scalable height component, and the scalable width component are used in generating the linear system of equations.

6. The method of claim 5, wherein generating the linear system of equations comprises:
- generating a first equation by equating a sum of the absolute width components and the scalable width components with corresponding scaling factors applied thereto to a fixed width, the fixed width being the fixed dimension, the scaling factors being unknown; and
- generating second equations by equating a height of each image module to a height of another image module, wherein image module height for each image module includes a sum of a corresponding absolute height component and a corresponding scalable height component with a corresponding scaling factor applied thereto.

7. The method of claim 5, wherein generating the linear system of equations comprises:
- generating a first equation by equating a sum of the absolute height components and the scalable height components with corresponding scaling factors applied thereto to a fixed height, the fixed height being the fixed dimension, the scaling factors being unknown; and
- generating second equations by equating a width of each image module to a width of another image module, wherein image module width for each image module includes a sum of a corresponding absolute width component and a corresponding scalable width component with a corresponding scaling factor applied thereto.

8. The method of claim 5, wherein image modules are to be arranged in a matrix comprising multiple rows and having a fixed height, the fixed height being the fixed dimension;
- wherein generating the linear system of equations comprises:
  - generating first equations by equating a width of each row to a width of another row, wherein row width for each row includes sums of image module widths in the corresponding row, each image module width comprising a sum of a corresponding absolute width component and corresponding scalable width component with a corresponding scaling factor applied thereto;
  - generating second equations by equating, for each row, a height of each image module in the corresponding row to a height of another image module in the corresponding row, wherein image module height for each image module in a row includes a sum of a corresponding absolute height component and a corresponding scalable height component with a corresponding scaling factor applied thereto; and
  - generating a third equation by selecting one image module from each row, summing heights of the selected image modules, and equating the summed height to the fixed height, wherein a height of a corresponding selected image module includes a sum of a corresponding absolute height component and a corresponding scalable height component with a corresponding scaling factor applied thereto.

9. The method of claim 5, wherein image modules are to be arranged in a matrix comprising multiple columns and having a fixed width, the fixed width being the fixed dimension;
- wherein generating the linear system of equations comprises:
  - generating first equations by equating a height of each column to a height of another column, wherein column height for each column includes sums of image module height in the corresponding column, each image module height comprising a sum of a corresponding absolute height component and corresponding scalable height component with a corresponding scaling factor applied thereto;
  - generating second equations by equating, for each column, a width of each image module in the corresponding column to a width of another image module in the corresponding column, wherein image module width for each image module in a column includes a sum of a corresponding absolute width component and a corresponding scalable width component with a corresponding scaling factor applied thereto; and
  - generating a third equation by selecting one image module from each column, summing widths of the selected image modules, and equating the summed width to the fixed width, wherein a width of a corresponding selected image module includes a sum of a corresponding absolute width component and a corresponding scalable width component with a corresponding scaling factor applied thereto.

10. The method of claim 1, wherein the image module comprises an image, the image being an advertisement; and
- wherein the scaled image modules are arranged as part of a matrix comprising an electronic circular.

11. One or more non-transitory machine-readable media storing instructions that are executable to perform operations comprising:
- identifying scalable parts and unscalable parts of image modules that are to be scaled to fit within fixed dimensions;
- determining scaling factors that are to be applied to the scalable parts of the image modules to scale the image modules;
- applying the scaling factors to the scalable parts of the images modules to produce scaled image modules that fit within the fixed dimensions, the unscalable parts being unaffected by the scaling factors; and
- generating data for displaying the scaled image modules on a computing device display screen;
- wherein each image module comprises:
  - scalable parts and unscalable parts;

absolute dimension components that include sums of a dimension of unscalable parts of the corresponding image module;

scalable dimension components that include sums of dimensions of scalable parts of the corresponding image module; and wherein determining the scaling factors comprises performing operations comprising:

generating a linear system of equations equating, to corresponding fixed dimensions, sums of absolute dimension components and scalable dimension components multiplied by corresponding scaling factors; and solving the linear system of equations for the scaling factors.

12. The one or more non-transitory machine-readable media of claim 11, wherein each of the image modules comprises an image, the image being a scalable part.

13. The one or more non-transitory machine-readable media of claim 12, wherein at least some of the image modules comprise an information bar, the information bar for displaying information relating a corresponding image, wherein, for each image module, the information bar is an unscalable part.

14. The one or more non-transitory machine-readable media of claim 12, wherein at least some of the image modules comprise padding, the padding comprising pixels adjacent to a corresponding image and apart from the corresponding image, wherein for each image module, the padding is either a scalable part or an unscalable part.

15. The one or more non-transitory machine-readable media of claim 11, wherein each image module comprises one or more of:

an absolute height component that includes sums of heights of unscalable parts of the corresponding image module, the absolute height component being an absolute dimension component;

an absolute width component that includes sums of widths of unscalable parts of the corresponding image module, the absolute width component being an absolute dimension component;

a scalable height component that includes sums of heights of scalable parts of the corresponding image module, the scalable height component being a scalable dimension component; and a scalable width component that includes sums of widths of scalable parts of the corresponding image module, the scalable height component being a scalable dimension component; and wherein one or more of the absolute height component, the absolute width component, the scalable height component, and the scalable width component are used in generating the linear system of equations.

16. The one or more non-transitory machine-readable media of claim 15, wherein generating the linear system of equations comprises:

generating a first equation by equating a sum of the absolute width components and the scalable width components with corresponding scaling factors applied thereto to a fixed width, the fixed width being the fixed dimension, the scaling factors being unknown; and generating second equations by equating a height of each image module to a height of another image module, wherein image module height for each image module includes a sum of a corresponding absolute height component and a corresponding scalable height component with a corresponding scaling factor applied thereto.

17. The one or more non-transitory machine-readable media of claim 15, wherein generating the linear system of equations comprises:

generating a first equation by equating a sum of the absolute height components and the scalable height components with corresponding scaling factors applied thereto to a fixed height, the fixed height being the fixed dimension, the scaling factors being unknown; and generating second equations by equating a width of each image module to a width of another image module, wherein image module width for each image module includes a sum of a corresponding absolute width component and a corresponding scalable width component with a corresponding scaling factor applied thereto.

18. The one or more non-transitory machine-readable media of claim 15, wherein image modules are to be arranged in a matrix comprising multiple rows and having a fixed height, the fixed height being the fixed dimension;

wherein generating the linear system of equations comprises:

generating first equations by equating a width of each row to a width of another row, wherein row width for each row includes sums of image module widths in the corresponding row, each image module width comprising a sum of a corresponding absolute width component and corresponding scalable width component with a corresponding scaling factor applied thereto;

generating second equations by equating, for each row, a height of each image module in the corresponding row to a height of another image module in the corresponding row, wherein image module height for each image module in a row includes a sum of a corresponding absolute height component and a corresponding scalable height component with a corresponding scaling factor applied thereto; and generating a third equation by selecting one image module from each row, summing heights of the selected image modules, and equating the summed height to the fixed height, wherein a height of a corresponding selected image module includes a sum of a corresponding absolute height component and a corresponding scalable height component with a corresponding scaling factor applied thereto.

19. The one or more non-transitory machine-readable media of claim 15, wherein image modules are to be arranged in a matrix comprising multiple columns and having a fixed width, the fixed width being the fixed dimension;

wherein generating the linear system of equations comprises:

generating first equations by equating a height of each column to a height of another column, wherein column height for each column includes sums of image module height in the corresponding column, each image module height comprising a sum of a corresponding absolute height component and corresponding scalable height component with a corresponding scaling factor applied thereto;

generating second equations by equating, for each column, a width of each image module in the corresponding column to a width of another image module in the corresponding column, wherein image module width for each image module in a column includes a sum of a corresponding absolute width component and a corresponding scalable width component with a corresponding scaling factor applied thereto; and generating a third equation by selecting one image module from each column, summing widths of the selected image modules, and equating the summed width to the fixed width, wherein a width of a corresponding selected image module includes a sum of a corresponding absolute width component and a corresponding scalable width component with a corresponding scaling factor applied thereto.

20. The one or more non-transitory machine-readable media of claim 11, wherein the image module comprises an image, the image being an advertisement; and
wherein the scaled image modules are arranged as part of a matrix comprising an electronic circular.

21. A system comprising:
a scaling engine for performing operations comprising:
identifying scalable parts and unscalable parts of image modules that are to be scaled to fit within a fixed dimensions;
determining scaling factors that are to be applied to the scalable parts of the image modules to scale the image modules; and
applying the scaling factors to the scalable parts of the images modules to produce scaled image modules that fit within the fixed dimensions, the unscalable parts being unaffected by the scaling factors; and
a layout engine for performing operations comprising generating data for displaying the scaled image modules on a computing device display screen;
wherein each image module comprises:
scalable parts and unscalable parts;
absolute dimension components that include sums of a dimension of unscalable parts of the corresponding image module;
scalable dimension components that include sums of dimensions of scalable parts of the corresponding image module; and
wherein determining the scaling factors comprises performing operations comprising:
generating a linear system of equations equating, to corresponding fixed dimensions, sums of absolute dimension components and scalable dimension components multiplied by corresponding scaling factors; and
solving the linear system of equations for the scaling factors.

22. The system of claim 21, wherein each of the image modules comprises an image, the image being a scalable part.

23. The system of claim 22, wherein at least some of the image modules comprise an information bar, the information bar for displaying information relating a corresponding image, wherein, for each image module, the information bar is an unscalable part.

24. The system of claim 22, wherein at least some of the image modules comprise padding, the padding comprising pixels adjacent to a corresponding image and apart from the corresponding image, wherein for each image module, the padding is either a scalable part or an unscalable part.

25. The system of claim 21, wherein each image module comprises one or more of:
an absolute height component that includes sums of heights of unscalable parts of the corresponding image module, the absolute, the absolute height component being an absolute dimension component;
an absolute width component that includes sums of widths of unscalable parts of the corresponding image module, the absolute width component being an absolute dimension component;
a scalable height component that includes sums of heights of scalable parts of the corresponding image module, the scalable height component being a scalable dimension component; and
a scalable width component that includes sums of widths of scalable parts of the corresponding image module, the scalable width component being a scalable dimension component; and
wherein one or more of the absolute height component, the absolute width component, the scalable height component, and the scalable width component are used in generating the linear system of equations.

26. The system of claim 25, wherein the process generating the linear system of equations comprises:
generating a first equation by equating a sum of the absolute width components and the scalable width components with corresponding scaling factors applied thereto to a fixed width, the fixed width being the fixed dimension, the scaling factors being unknown; and
generating second equations by equating a height of each image module to a height of another image module, wherein image module height for each image module includes a sum of a corresponding absolute height component and a corresponding scalable height component with a corresponding scaling factor applied thereto.

27. The system of claim 25, wherein generating the linear system of equations comprises:
generating a first equation by equating a sum of the absolute height components and the scalable height components with corresponding scaling factors applied thereto to a fixed height, the fixed height being the fixed dimension, the scaling factors being unknown; and
generating second equations by equating a width of each image module to a width of another image module, wherein image module width for each image module includes a sum of a corresponding absolute width component and a corresponding scalable width component with a corresponding scaling factor applied thereto.

28. The system of claim 25, wherein image modules are to be arranged in a matrix comprising multiple rows and having a fixed height, the fixed height being the fixed dimension;
wherein generating the linear system of equations comprises:
generating first equations by equating a width of each row to a width of another row, wherein row width for each row includes sums of image module widths in the corresponding row, each image module width comprising a sum of a corresponding absolute width component and corresponding scalable width component with a corresponding scaling factor applied thereto;
generating second equations by equating, for each row, a height of each image module in the corresponding row to a height of another image module in the corresponding row, wherein image module height for each image module in a row includes a sum of a corresponding absolute height component and a corresponding scalable height component with a corresponding scaling factor applied thereto; and
generating a third equation by selecting one image module from each row, summing heights of the selected image modules, and equating the summed height to the fixed height, wherein a height of a corresponding selected image module includes a sum of a corresponding absolute height component and a corresponding scalable height component with a corresponding scaling factor applied thereto.

29. The system of claim 25, wherein image modules are to be arranged in a matrix comprising multiple columns and having a fixed width, the fixed width being the fixed dimension;
   wherein generating the linear system of equations comprises:
      generating first equations by equating a height of each column to a height of another column, wherein column height for each column includes sums of image module height in the corresponding column, each image module height comprising a sum of a corresponding absolute height component and corresponding scalable height component with a corresponding scaling factor applied thereto;
      generating second equations by equating, for each column, a width of each image module in the corresponding column to a width of another image module in the corresponding column, wherein image module width for each image module in a column includes a sum of a corresponding absolute width component and a corresponding scalable width component with a corresponding scaling factor applied thereto; and
      generating a third equation by selecting one image module from each column, summing widths of the selected image modules, and equating the summed width to the fixed width, wherein a width of a corresponding selected image module includes a sum of a corresponding absolute width component and a corresponding scalable width component with a corresponding scaling factor applied thereto.

30. The system of claim 21, wherein the image module comprises an image, the image being an advertisement; and wherein the scaled image modules are arranged as part of a matrix comprising an electronic circular.

* * * * *